Figure 1:
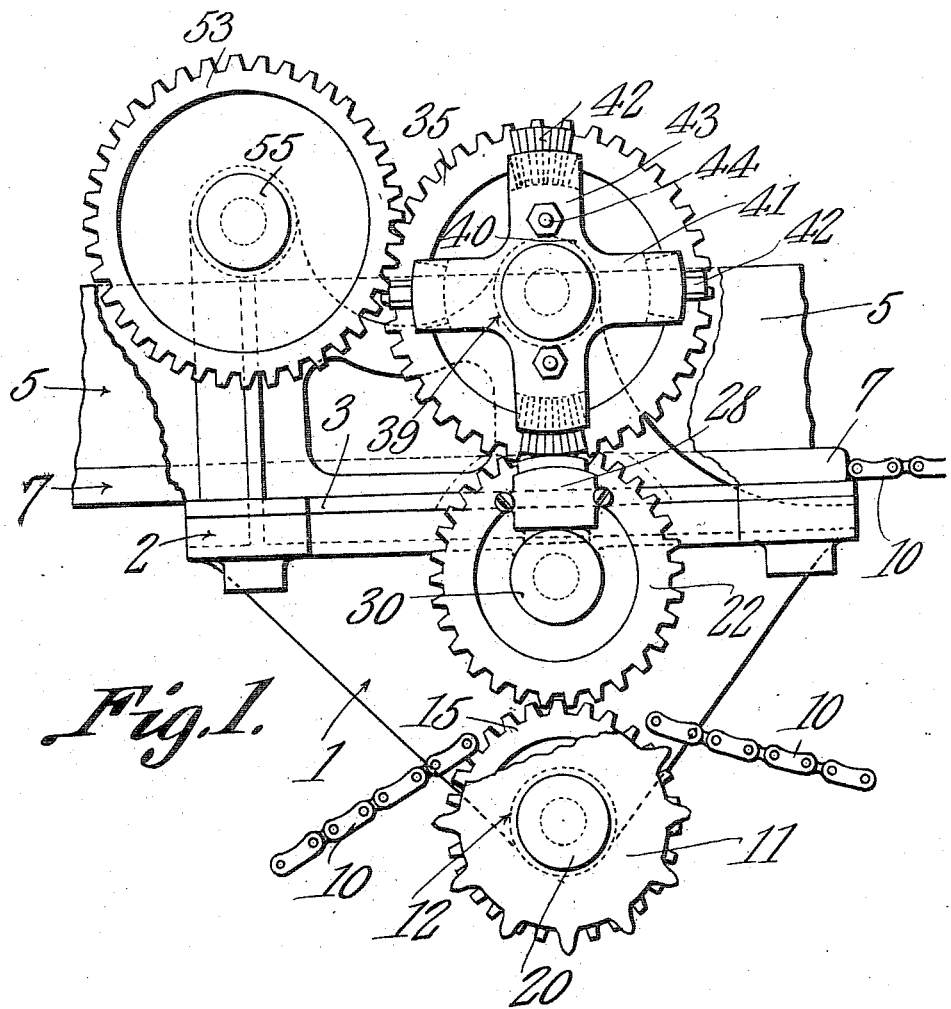

W. ROSE.
PACKAGE INDICATING MACHINE.
APPLICATION FILED JULY 26, 1910.

985,939.

Patented Mar. 7, 1911.
4 SHEETS—SHEET 1.

William Rose,
Inventor

Witnesses by
Attorneys

W. ROSE.
PACKAGE INDICATING MACHINE.
APPLICATION FILED JULY 26, 1910.
985,939.
Patented Mar. 7, 1911.
4 SHEETS—SHEET 2.
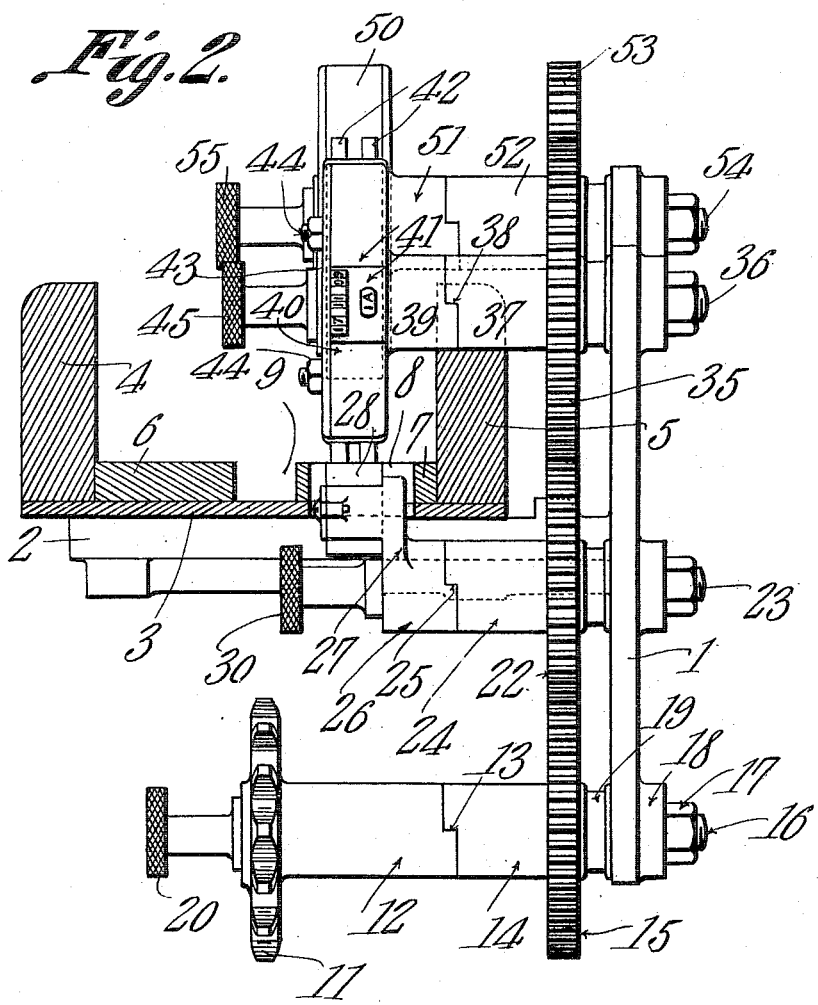
Witnesses
William Rose,
Inventor.
by C. A. Snow & Co.
Attorneys W. ROSE.
PACKAGE INDICATING MACHINE.
APPLICATION FILED JULY 26, 1910.
985,939.
Patented Mar. 7, 1911.
4 SHEETS—SHEET 3.
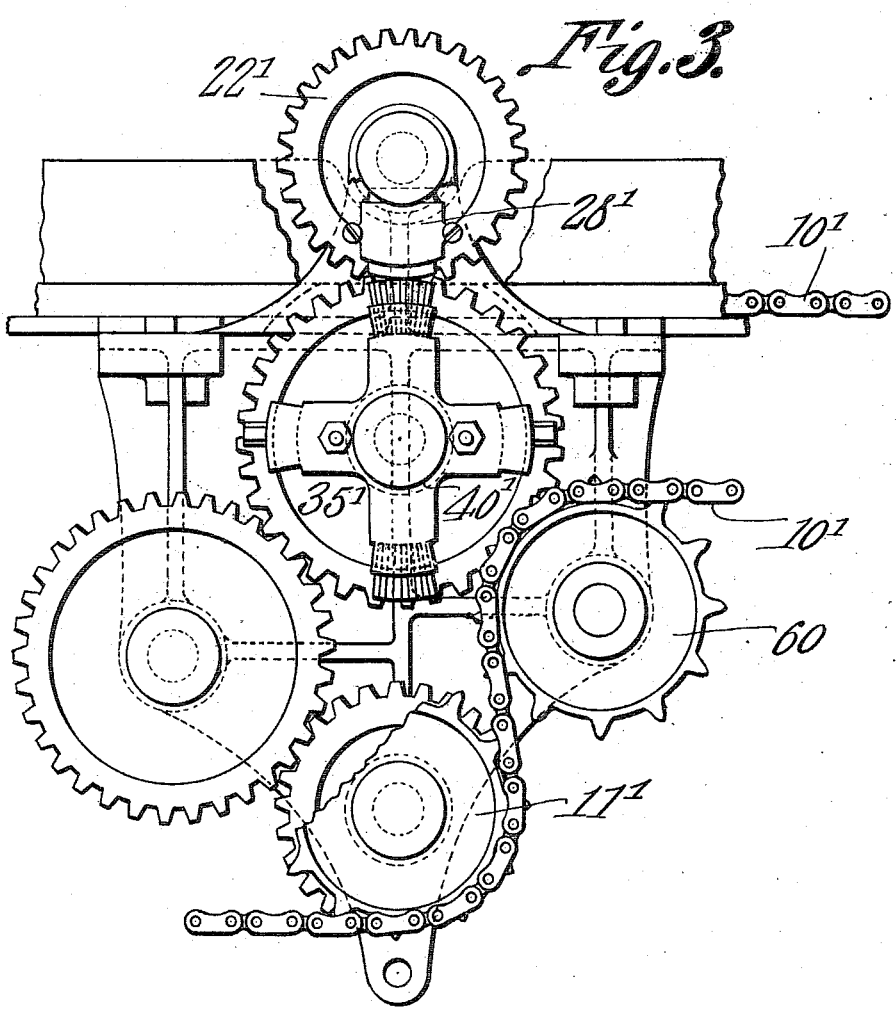
Witnesses
William Rose,
Inventor.
by C. A. Snow & Co.
Attorneys

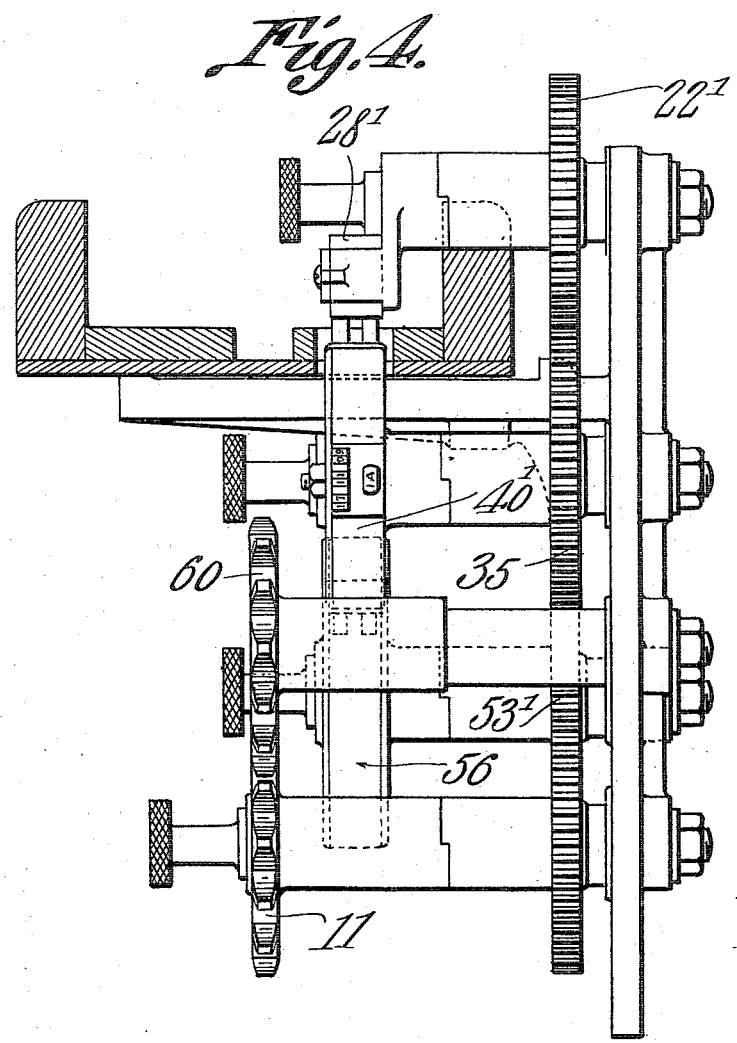

UNITED STATES PATENT OFFICE.

WILLIAM ROSE, OF GAINSBOROUGH, ENGLAND, ASSIGNOR TO RICHARD H. WRIGHT, OF DURHAM, NORTH CAROLINA.

PACKAGE-INDICATING MACHINE.

985,939.     Specification of Letters Patent.    Patented Mar. 7, 1911.

Application filed July 26, 1910. Serial No. 573,872.

*To all whom it may concern:*

Be it known that I, WILLIAM ROSE, a subject of the King of England, residing at Gainsborough, in the county of Lincoln, England, have invented a new and useful Package-Indicating Machine, of which the following is a specification.

This invention relates generally to package indicating machines and particularly to improved means for applying different markings or indications to a series of papers or other material especially intended for use as wrappers, labels or other similar articles in packaging, labeling or wrapping machines.

The object of the present invention is to provide means for indicating which attendant, out of a number of attendants working at the same machine, has supplied the contents of any particular package operated upon by the machine.

A further object of the invention is to provide a package indicating machine, which will feed a continuous series of wrappers, labels or the like, and will mark the different labels or wrappers with indicating marks by which the attendant weighing or measuring the material to be inclosed can be identified.

With the foregoing and other objects in view, which will appear as the description proceeds, the invention resides in the combination and arrangement of parts, and in the details of construction hereinafter described and claimed, it being understood that changes in the precise embodiment of the invention herein disclosed can be made within the scope of the claims without departing from the spirit of the invention.

In the accompanying drawings forming part of this specification:—Figure 1 is a side elevation showing the working parts of the machine constructed in accordance with the invention. Fig. 2 is a view taken at a right angle to Fig. 1. Fig. 3 is a view similar to Fig. 1 showing modified construction in which the printing rotor is located beneath the table, instead of above, the same as in Fig. 1. Fig. 4 is a view taken at a right angle to Fig. 3 showing the modified construction.

Like reference numerals indicate corresponding parts in the different figures of the drawings.

The embodiments of invention herein illustrated consist of a pair of machines each consisting of a printing rotor or wheel which is adapted to print a series of different letters, numbers or other figures designed to designate the different operators who weigh or measure the material to be inclosed. The wrappers or labels, preparatory to being sent to the wrapping or labeling machine which forms no part of the present invention, and is not illustrated herein, are fed by means of an endless chain or other suitable apparatus, in between the printing rotor and the rotary pad, so that, for example, where four attendants are working on the labeling or packaging machine, every fourth wrapper carried through the machine of the present invention will have one symbol marked thereon to designate one attendant, and the other wrappers in series of four will have different symbols to indicate other attendants.

Referring particularly to Fig. 2 of the drawing, the reference numeral 1 indicates a vertically extending frame piece, which may be supported in any suitable manner. Extending forward from the frame piece 1 is a horizontally disposed supporting member or bracket 2 on which is mounted table 3 having thereon the upstanding sills or flanges 4 and 5 together with the longitudinally extending boards or members 6 and 7, the member 7 being formed with a slot or opening 8 which extends downward through the bracket or support 2 as well as the table 3 for a purpose herinafter described. The members 6 and 7 are suitably spaced away from each other to provide a channel 9 in which is slidably mounted an endless chain or other device 10 which is adapted to feed the papers, wrappers, labels or the like, through the machine in order that they may be printed upon in the manner hereinafter described. As the particular means by which the endless chain 10 grips the papers or wrappers and feeds them through the machine forms no part of the present invention, it has been deemed unnecessary to illustrate the same specifically herein.

The lower run of the endless chain 10, as shown in Fig. 1, is suitably engaged with a sprocket wheel 11 which is mounted upon a sleeve 12 connected by means of a lock joint 13 with a sleeve or hub 14 of a gear wheel 15. The sprocket wheel 11 together with the sleeves or hubs 12 and 14 and the gear wheel 15 are loosely mounted for rotation upon a stud shaft 16 which is mounted in the frame piece 1 and is held in position thereon by means of the nuts 17 together with the washers 18 and 19, the sprocket wheel 11 being held on the stud shaft 16 by means such as the screw 20 which is threaded into a suitable socket in the outer end of the stud shaft 16. The gear wheel 15 is in mesh with a gear wheel 22 which is loosely journaled on a stud shaft 23 mounted in the frame piece 1. The gear wheel 22 is provided with a sleeve portion or hub 24, which is clutched at 25 to a sleeve portion or hub 26 which carries a crank arm 27 on which is mounted a pad or the like 28 which, during the rotation thereof, is caused to pass up through the slot 8 in the member 7, so as to act as a pad or platen on one side of the paper, wrapper or label which is to be printed upon. The sleeve portions 24 and 26 are detachably held together upon the stud shaft 23 by means of a screw rod 30.

The gear wheel 22 is in mesh with a gear wheel 35, which is loosely mounted upon a stud shaft 36, and is provided with a hub or sleeve 37 which is locked at 38 to a hub or sleeve 39 of a spider frame or rotor 40, consisting of the radially extending members 41 which in the embodiment of invention illustrated, are four in number and which carry at their outer ends the printing members, letters or symbols 42 which are to indicate the particular attendant who weighs or measures the material being packed. In addition to the symbol or letter to indicate the different attendants, the spider arms 41 also carry other printed or indicating matter, such for instance as dates, stamps, members of different packages, etc. The indicating matter 42 preferably is held in the outer ends of the spider members 41 by means such as the removable cover plate 43 which, as shown in Fig. 2, is detachably secured to the spider by means such as the bolt 44. The spider 40 is held upon the stud shaft 36 in a detachable manner by means of the screw member 45.

The means for inking the indicating characters 42 preferably consists of an inking rotor 50 which is in the form of a wheel having a flanged rim between the flanges of which is mounted an inking pad. The inking rotor 50 is provided with a sleeve or hub 51 which is interlocked with a similar sleeve or hub 52 connected with a gear wheel 53 that is in mesh with the gear wheel 35 of the printing rotor 40. The inking rotor 50 is held in position upon a stud shaft 54 by means of the threaded member 55.

The teeth of the gear wheel 53 of the inking rotor 50 preferably are of different dimensions than the teeth of the gear wheel 35, whereby said gear wheels will have an irregular rotation with respect to each other, and the indicating symbols 42 of the printing rotor consequently will not strike the same portion of the inking pad during each revolution, and the life of said pad will consequently be prolonged.

As shown in Fig. 1, the gear wheel 22 which rotates the rotor 28, is of a diameter approximately three-fourths as large as that of the gear wheel 35 which rotates the spider 40.

Constructed as described, the operation of the construction illustrated in Fig. 1 is approximately as follows: Each time the gear wheel 22 is caused to make one complete revolution by means of the endless chain 10 which feeds the wrappers, the gear wheel 35 makes a three-quarter revolution. The wrappers are only printed upon when the platen rotor 28 is opposite one of the indicating characters on the spider 40. When the impression which is being made when the parts are in the position shown in Fig. 1 is completed, and the gear wheel makes a complete revolution, the inking symbol which in Fig. 1 is just touching the inking pad, will have moved around and will consequently be the next symbol which is pressed upon the wrapper. The third symbol to be impressed upon the wrapper will be the one which is shown at the top of Fig. 1 and the fourth symbol to be brought into play is the one shown at the right hand side of Fig. 1. By securing the mechanism in this fashion, it is possible for a very long wrapper to be passed through the machine without necessitating the employment of a spider 40 of equally large diameter to fit the long wrappers. By utilizing the endless chain 10 to feed the wrappers through the machine in any suitable manner and likewise to operate the platen rotor as well as the printing and inking rotors, the machine is caused to operate at all times in perfect synchronism.

In the event that it is desired to change the number of operations which the machine is adapted to perform in a single series, the inking spider, platen, etc., can be removed by loosening the screws 30, 45 and 55 and substituting new devices. This operation will only be necessary where it is desired, for example, that the machine should print the symbols in some other series than four, so that for instance if the series of three be used, then every third wrapper will contain the same symbol and every second wrapper the same symbol and every first wrapper the same symbol.

The modified construction illustrated in Figs. 3 and 4 is the same as that shown in Figs. 1 and 2 except that the platen rotor 28' is disposed above the table and the inking rotor 40' and inking pad 50 are located beneath the table so that the symbols will be impressed on the under side of the wrapper instead of on the upper side thereof as in Figs. 1 and 2. Moreover an idle sprocket wheel 60 is employed. The chain 10', after passing over the table for the purpose of feeding the wrappers therealong in any suitable manner, extends down on its lower run and engages the idle sprocket wheel 60, after which it passes to the sprocket wheel 11'. The rotation of the sprocket wheel 11' is transmitted to the gear wheel 53' from which it is transmitted to the gear wheel 35' and from thence the power is transmitted to the gear wheel 22'. The gear wheel 53' operates the inking pad; the gear wheel 35' operates the inking rotor 40'; and the gear wheel 22' operates the platen rotor 28'.

The machine of the present invention, as herein set forth, is strong, simple, durable and comparatively inexpensive in construction as well as thoroughly efficient in operation.

What is claimed as new is:—

1. A machine of the character specified having a table formed with an opening therein and having a longitudinal trough, a printing rotor on one side of said table, a platen rotor on the other side of said table, and being adapted to operate through the opening therein to engage said printing rotor, a chain extending longitudinally of said trough, and means operated by said chain for rotating said rotors.

2. A machine of the character specified having a vertically extending frame piece, a table supported thereby and having a trough and an opening therein, a chain extending through said trough, a plurality of stud shafts connected with said frame piece, a plurality of gear wheels mounted on said shaft and each having a hub formed with a clutch member, inking and printing and platen rotors mounted on said stud shaft, and each having a clutch in engagement with the clutch of one of said gear wheels, and a sprocket wheel in mesh with the chain of said table for operating all of said gear wheels, so as to cause the inking, printing and platen rotors to operate at different peripheral speeds.

In testimony that I claim the foregoing as my own, I have hereto affixed my signature in the presence of two witnesses.

WILLIAM ROSE.

Witnesses:
GILBERT FLETCHER TYSON,
WILLIAM GERALD REYNOLDS.

---

Copies of this patent may be obtained for five cents each, by addressing the "Commissioner of Patents, Washington, D. C."